(12) United States Patent
Marten et al.

(10) Patent No.: US 12,668,299 B2
(45) Date of Patent: Jun. 30, 2026

(54) STEERING DEVICE FOR A MOTOR VEHICLE

(71) Applicants: thyssenkrupp Presta AG, Eschen (LI); thyssenkrupp AG, Essen (DE)

(72) Inventors: Marco Marten, Sevelen (CH); Kristof Polmans, Tarrenz (AT); Imre Szepessy, Mauren (LI); Manuel Rohrmoser, Thueringen (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/799,463

(22) Filed: Aug. 9, 2024

(65) Prior Publication Data

US 2025/0050941 A1      Feb. 13, 2025

(30) Foreign Application Priority Data

Aug. 11, 2023    (BE) .................................. 2023/5678

(51) Int. Cl.
| | |
|---|---|
| *B62D 5/04* | (2006.01) |
| *B62D 5/22* | (2006.01) |
| *B62D 6/00* | (2006.01) |
| *B62D 15/02* | (2006.01) |

(52) U.S. Cl.
CPC ............. *B62D 5/0463* (2013.01); *B62D 5/22* (2013.01); *B62D 6/008* (2013.01); *B62D 15/022* (2013.01)

(58) Field of Classification Search
CPC ........ B62D 5/0463; B62D 5/22; B62D 6/008; B62D 15/022

USPC .......................................................... 701/42
See application file for complete search history.

(56) References Cited

U.S. PATENT DOCUMENTS

| | | | | |
|---|---|---|---|---|
| 6,219,604 | B1 * | 4/2001 | Dilger .................... | B62D 6/008 180/443 |
| 6,612,392 | B2 * | 9/2003 | Park ........................ | B62D 5/005 701/41 |
| 8,180,529 | B2 * | 5/2012 | Suzuki ................. | B62D 5/0472 318/287 |
| 8,820,469 | B2 * | 9/2014 | Sakaguchi ........... | B62D 5/0472 180/443 |
| 10,351,162 | B1 * | 7/2019 | Katzourakis ........... | B62D 5/001 |
| 2003/0055546 | A1 * | 3/2003 | Demerly ................ | B62D 6/008 180/443 |

(Continued)

FOREIGN PATENT DOCUMENTS

| | | |
|---|---|---|
| DE | 112020004023 A1 | 5/2022 |

*Primary Examiner* — Logan M Kraft
*Assistant Examiner* — John D Bailey
(74) *Attorney, Agent, or Firm* — thyssenkrupp North America, LLC

(57) ABSTRACT

A steering device for a motor vehicle, in particular a "steer-by-wire" steering device, comprises a steering wheel, which is able to act on a steering sensor for measuring the rotation angle position of the steering wheel, an electromechanical actuator, which is able to act on a rack for steering wheels, and an electronic controller, which is adapted to detect the steering wheel angle position and to control the electromechanical actuator, wherein the steering device further comprises a feedback actuator acting on the steering wheel, wherein the controller is adapted to measure natural oscillations of the motor vehicle and to apply them with a corresponding amplitude to the feedback actuator.

7 Claims, 2 Drawing Sheets

(56)         References Cited

U.S. PATENT DOCUMENTS

| | | | | | |
|---|---|---|---|---|---|
| 2010/0217487 | A1* | 8/2010 | Murakami | B62D 5/0463 | 701/42 |
| 2011/0153162 | A1* | 6/2011 | Kezobo | B62D 5/0463 | 701/42 |
| 2013/0311044 | A1* | 11/2013 | Tamaizumi | B62D 6/08 | 701/42 |
| 2014/0365077 | A1* | 12/2014 | Kariatsumari | B62D 5/0463 | 701/41 |
| 2015/0088381 | A1* | 3/2015 | Imamura | B62D 6/008 | 701/41 |
| 2015/0191200 | A1* | 7/2015 | Tsubaki | B62D 15/025 | 701/42 |
| 2016/0001810 | A1* | 1/2016 | Tsubaki | B62D 6/08 | 701/42 |
| 2017/0267276 | A1* | 9/2017 | Kodera | B62D 5/0463 | |
| 2018/0134309 | A1* | 5/2018 | Moulaire | B62D 5/0463 | |
| 2019/0047617 | A1* | 2/2019 | Oblizajek | B62D 5/006 | |
| 2019/0256133 | A1* | 8/2019 | Tsubaki | B62D 6/008 | |
| 2019/0337562 | A1* | 11/2019 | Endo | B62D 5/0472 | |
| 2019/0359248 | A1* | 11/2019 | Tsubaki | B62D 5/0463 | |
| 2020/0130736 | A1* | 4/2020 | Kodera | B62D 5/0463 | |
| 2020/0130739 | A1* | 4/2020 | Kodera | B62D 6/008 | |
| 2020/0324808 | A1* | 10/2020 | Kodera | B62D 5/0463 | |
| 2020/0339187 | A1* | 10/2020 | Tamaizumi | B62D 5/0463 | |
| 2022/0009546 | A1* | 1/2022 | Mori | B62D 5/049 | |
| 2022/0009547 | A1* | 1/2022 | Osajima | B62D 5/0463 | |
| 2022/0097760 | A1* | 3/2022 | Mori | B62D 6/008 | |
| 2022/0315103 | A1* | 10/2022 | Mori | B62D 5/0463 | |
| 2022/0340199 | A1* | 10/2022 | Yeon | B62D 6/008 | |
| 2022/0355856 | A1* | 11/2022 | Tanaka | B62D 6/008 | |
| 2023/0065739 | A1* | 3/2023 | Husslein | B62D 5/0463 | |
| 2023/0166789 | A1* | 6/2023 | Chugh | B62D 6/10 | 701/41 |
| 2023/0198451 | A1* | 6/2023 | Kim | H02P 29/20 | 318/490 |
| 2024/0051600 | A1* | 2/2024 | Wilson-Jones | B62D 5/0463 | |
| 2024/0101186 | A1* | 3/2024 | Kim | B62D 5/0463 | |

* cited by examiner

STEERING DEVICE FOR A MOTOR VEHICLE

CROSS REFERENCE TO RELATED APPLICATION

This application is a U.S. Non-Provisional that claims priority to Belgian Patent Application No. BE 2023/5678, filed Aug. 11, 2023, the entire content of which is incorporated herein by reference.

FIELD

The present disclosure relates to a steering device for a vehicle, in particular a motor vehicle.

BACKGROUND

Steering devices for motor vehicles, in particular so-called steer-by-wire systems, are well known.

Steer-by-wire is understood as meaning a system in vehicle technology in which a steering command is transmitted solely electrically from a sensor (in particular the steering wheel) via one or more controllers to the electromechanical actuator, which executes the steering command. In such a system there is no mechanical connection between the steering wheel and the steered wheels.

Because the direct mechanical connection between the steering gear and the steering wheel (intermediate shaft) is omitted in steer-by-wire vehicles, the driver receives feedback about naturally occurring oscillations (wheels, engine, transmission, etc.) in the vehicle only in attenuated form. These oscillations are transmitted to the steering wheel only via the chassis and the screw points of the upper steering column.

Although usable steering devices have already become known, they are in need of improvement.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
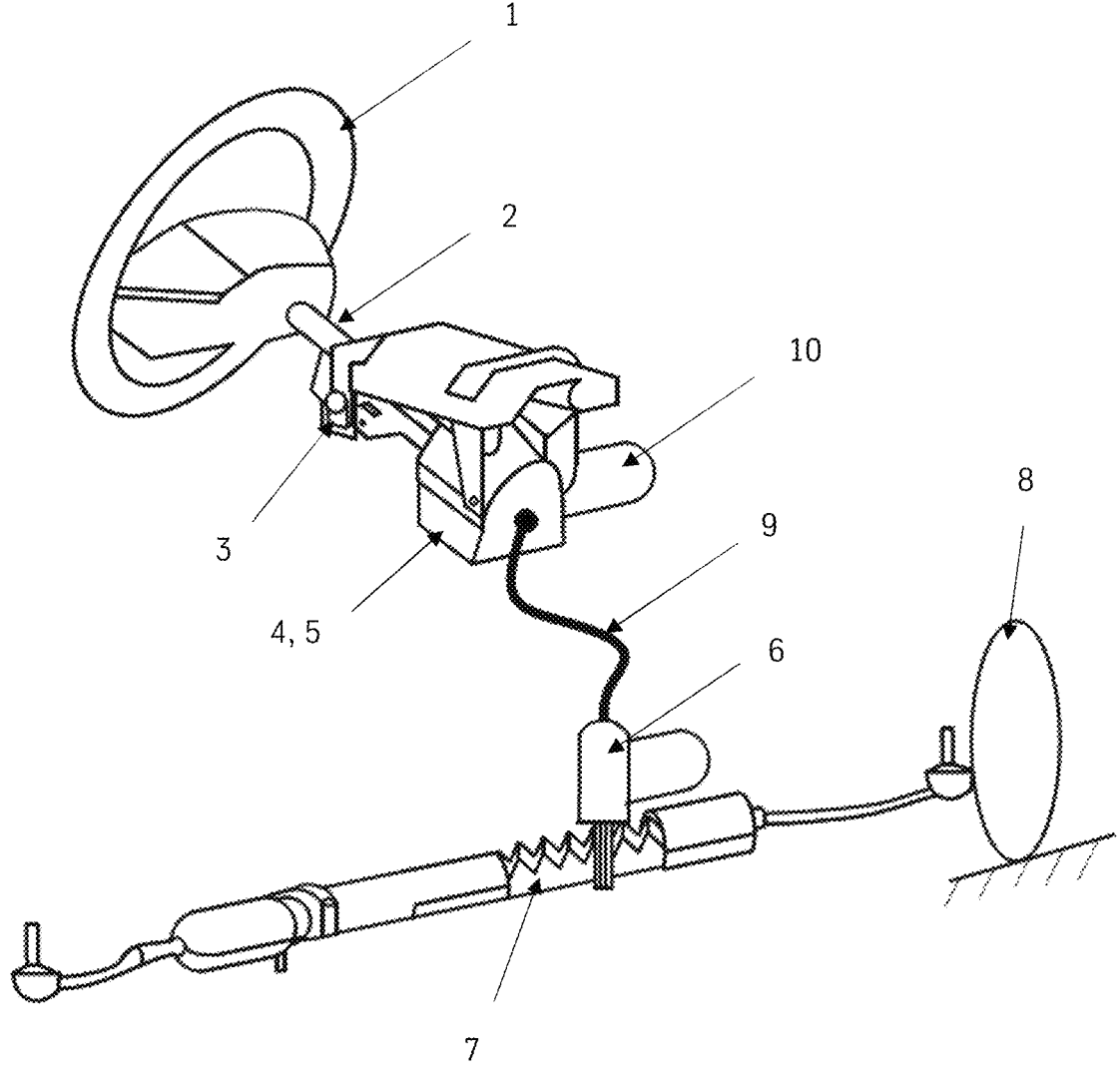
FIG. 1 shows a steering device in a schematic representation.

Some embodiments provide an improved steering device for a motor vehicle. Some embodiments provide a steering device with which the problems or disadvantages outlined above can be remedied or at least mitigated. Because the steering feel of steer-by-wire vehicles is to be as natural as possible, some embodiments feed the oscillations that occur in the vehicle back to the steering wheel.

Because the controller is adapted to measure natural oscillations of the vehicle and to apply them to the feedback actuator with a corresponding amplitude, the steering feel of steer-by-wire vehicles can be made as natural as possible.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In an advantageous embodiment of the invention, it can be provided that the controller comprises a first amplifier for the signals relating to vehicle velocity, accelerator position, road deviation, etc., a first sine wave generator, a second amplifier for the signals relating to vehicle velocity, accelerator position, etc., a second sine wave generator, a third amplifier for the signals relating to vehicle velocity, accelerator position, road deviation, etc., a third sine wave generator, a signal filtering/signal modifying unit, a fourth amplifier, and also a first summing unit and a second summing unit.

In a further advantageous embodiment of the invention, it can be provided that the first amplifier comprises an input and an output, wherein the first sine wave generator comprises a first input, a second input and a first output, wherein a signal relating to engine speed can be supplied to the first input, wherein a signal relating to torque can be supplied to the first output, wherein the second amplifier comprises an input and an output, wherein the second sine wave generator comprises a first input, a second input and a first output, wherein in particular a signal relating to wheel speed/tire profile frequency can be supplied to the first input, wherein in particular a signal relating to torque can be supplied to the first output, wherein the third amplifier comprises an input and an output, wherein the third sine wave generator comprises a first input, a second input and a first output, wherein in particular a signal relating to further vehicle signals that are already present in the form of a frequency, for example oscillations and/or vibrations of the transmission and/or of the differential, can be supplied to the first input, wherein in particular a signal relating to torque can be supplied to the first output, wherein the signal filtering/signal modifying unit comprises an input and an output, wherein in particular a signal relating to IMU (for example Z direction)/steering gear signals can be supplied to the first input, wherein the fourth amplifier comprises an input and an output, wherein the first summing unit comprises a first input, a second input, a third input and a fourth input, wherein the first summing unit comprises an output, wherein the second summing unit comprises a first input and a second input, wherein the second summing unit comprises an output. The transmissions, for example, also generate vibrations while running, which can be used as input signals by the steering device.

In a further advantageous embodiment of the invention, it can be provided that the output of the first amplifier is connected to the second input of the first sine wave generator, wherein the connection is adapted to transmit an amplitude signal; wherein the output of the second amplifier is connected to the second input of the second sine wave generator, wherein the connection is adapted to transmit an amplitude signal, wherein the output of the third amplifier is connected to the second input of the third sine wave generator, wherein the connection is adapted to transmit an amplitude signal.

In a further advantageous embodiment of the invention, it can be provided that the output of the first sine wave generator is connected to the first input of the first summing unit, wherein the connection is adapted to transmit a signal relating to a torque, wherein the output of the second sine wave generator is connected to the second input of the first summing unit, wherein the connection is adapted to transmit a signal relating to a torque, wherein the output of the third sine wave generator is connected to the third input of the first summing unit, wherein the connection is adapted to transmit a signal relating to a torque.

In a further advantageous embodiment of the invention, it can be provided that the output of the signal filtering/signal modifying unit is connected to the input of the fourth amplifier, wherein the output of the fourth amplifier is connected to the fourth input of the first summing unit, wherein the connection is adapted to transmit a signal relating to a torque, wherein the first input of the second summing unit is adapted to be supplied with a signal relating to basic steering feel torque request, wherein the output of the first summing unit is connected to the second input of the second summing unit, wherein the connection is adapted to transmit a signal relating to natural oscillation torque request, wherein the output of the second summing unit is adapted to be supplied with a signal relating to feedback actuator (FBA) torque demand.

The following reference signs are used in the figures:
1 steering wheel
2 steering column
3 screw point
4 steering sensor
5 controller
6 actuator
7 rack
8 wheel
9 wire
10 feedback actuator
G1 first amplifier (vehicle velocity, accelerator position, road deviation, etc.)
EG1 input of the first amplifier G1
AG1 output of the first amplifier G1 (amplitude)
G2 second amplifier (vehicle velocity, accelerator position, etc.)
EG2 input of the second amplifier G2
AG2 output of the second amplifier G2 (amplitude)
G3 third amplifier (vehicle velocity, accelerator position, road deviation, etc.)
EG3 input of the third amplifier G3
AG3 output of the third amplifier G3 (amplitude)
G4 fourth amplifier
EG4 input of the fourth amplifier G4
AG4 output of the fourth amplifier G4 (torque)
S1 first sine wave generator
S2 second sine wave generator
S3 third sine wave generator
ES11 first input of the first sine wave generator S1 (input signal engine speed)
ES12 second input of the first sine wave generator S1 (amplitude)
ES21 first input of the second sine wave generator S2 (input signal wheel speed/tire-speed/tyre profile frequency)
ES22 second input of the second sine wave generator S2 (amplitude)

ES31 first input of the third sine wave generator S3 (further vehicle signals, for example oscillations and/or vibrations of the transmission and/or of the differential)
ES32 second input of the third sine wave generator S3 (amplitude)
AS11 output of the first sine wave generator S1 (torque)
AS21 output of the second sine wave generator S2 (torque)
AS31 output of the third sine wave generator S3 (torque)
M1 signal filtering/signal modifying unit
EM1 input of the signal filtering/signal modifying unit M1 (IMU (for example Z direction)/–steering gear signals)
AM1 output of the signal filtering/signal modifying unit M1
SUM1 first summing unit
ESUM11 first input of the first summing unit
ESUM12 second input of the first summing unit
ESUM13 third input of the first summing unit
ESUM14 fourth input of the first summing unit
ASUM11 output of the first summing unit
SUM2 second summing unit
ESUM21 first input of the second summing unit (basic steeering feel torque request)
ESUM22 second input of the second summing unit (natural oscillation torque request)
ASUM21 output of the second summing unit (feedback actuator (FBA) torque demand)

Features and details that are described in connection with a method naturally also apply in connection with the apparatus according to the invention and vice versa, so that, in respect of the disclosure relating to the individual aspects of the invention, reciprocal reference is or can always be made. In addition, a method according to the invention that may be described can be carried out with the apparatus according to the invention.

The terminology used herein serves only for the purpose of describing specific embodiments and is not intended to limit the disclosure. As used herein, the singular forms "a/one" and "the" are also to include the plural forms, unless otherwise clearly apparent from the context. It will additionally be clear that the expressions "has" and/or "having", when used in this description, specify the presence of the mentioned features, integers, steps, operations, elements and/or components, but do not exclude the presence or the addition of one or more other features, integers, steps, operations, elements, components and/or groups thereof. As used herein, the expression "and/or" includes any desired and all combinations of one or more of the associated, listed elements.

Reference will first be made in particular to FIG. 1.

A steering device for a motor vehicle substantially comprises a steering wheel 1, which is able to act on a steering sensor 4 for measuring the rotation angle position of the steering wheel 1, an electromechanical actuator 6, which is able to act on a rack 7 for steering wheels 8, and an electronic controller 5, which is adapted to detect the steering wheel angle position and to control the electromechanical actuator 6, wherein the steering device further comprises a feedback actuator 10 acting on the steering wheel 1. For the sake of clarity, only one wheel 8 is shown.

The steering device further comprises in particular an upper steering column 2 and a screw point 3. The steering device is a so-called "steer-by-wire" system, in which there is no mechanical connection between the steering wheel 1 and the rack 7, or wheels 8. Instead, steering is effected by detecting the steering angle of the steering wheel 1 and correspondingly activating the actuator 6. The electrical connection is effected in this case by wire 9, that is to say in a wired manner, wherein the connection can be effected not directly but, for example, also via a bus system.

The further components, or the functioning, of such a steering device are/is well known to a person skilled in the art.

According to the invention, it is provided that the controller 5 is adapted to measure natural oscillations of the motor vehicle and to apply them with a corresponding amplitude to the feedback actuator 10.

Reference will be made hereinbelow in particular to FIG. 2.

Figure 2:
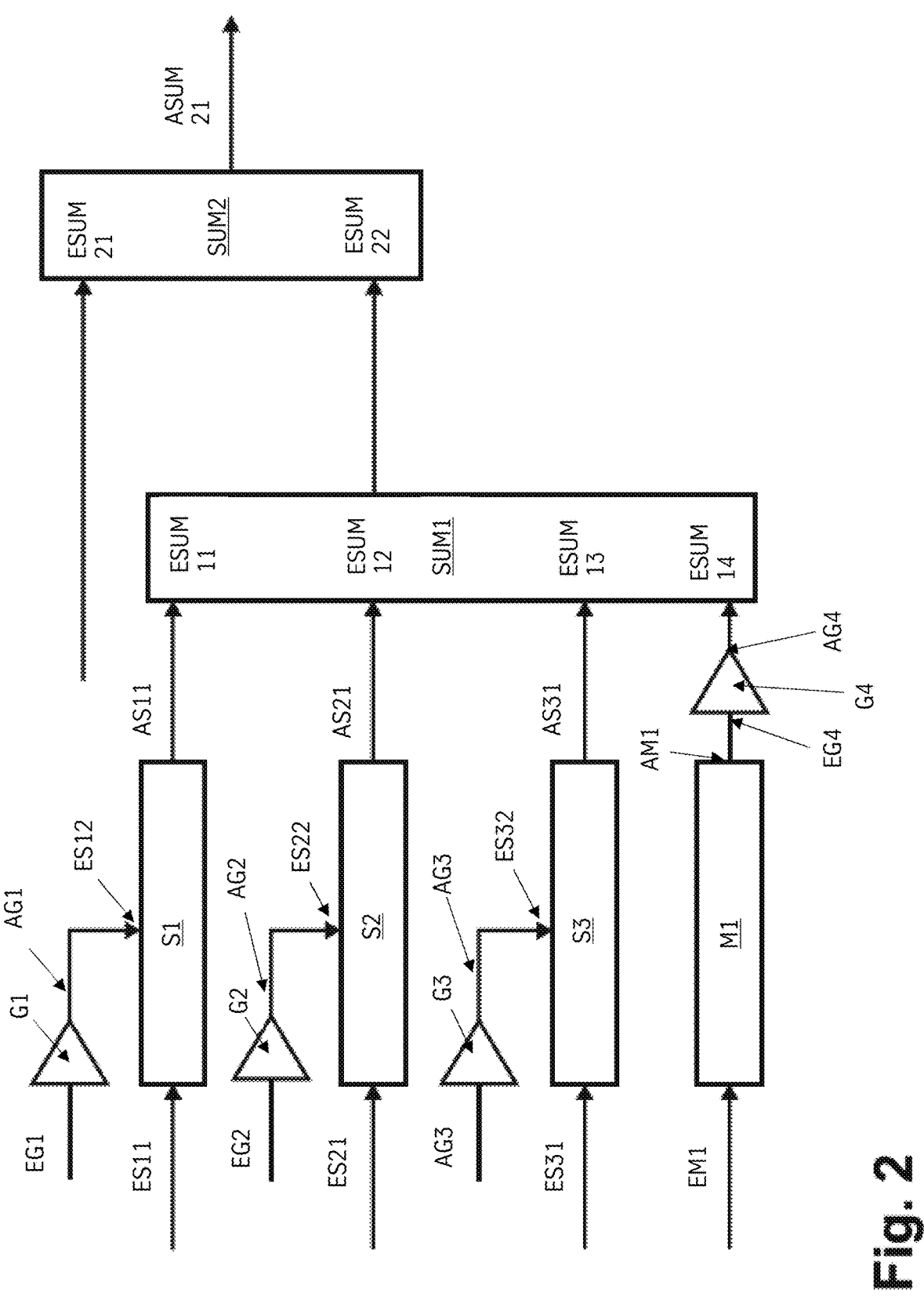
FIG. 2 is a schematic diagram of a controller for a steering device.

FIG. 2 is a schematic diagram of an electronic controller 5 for a steering device according to the invention, said steering device being suitable for the functions outlined above. The controller 5 comprises

- a first amplifier G1 for the signals relating to vehicle velocity, accelerator position, road deviation, etc.,
- a first sine wave generator S1,
- a second amplifier G2 for the signals relating to vehicle velocity, accelerator position, etc.,
- a second sine wave generator S2,
- a third amplifier G3 for the signals relating to vehicle velocity, accelerator position, road deviation, etc.,
- a third sine wave generator S3,
- a signal filtering/signal modifying unit M1,
- a fourth amplifier G4, and also
- a first summing unit SUM1 and a second summing unit SUM2.

The first amplifier G1 comprises an input EG1 and an output AG1.

The first sine wave generator S1 comprises a first input ES11, a second input ES12 and a first output AS11. A signal relating to engine speed is supplied to the first input ES11. A signal relating to torque is supplied to the first output AS11.

The second amplifier G2 comprises an input EG2 and an output AG2.

The second sine wave generator S2 comprises a first input ES21, a second input ES22 and a first output AS21. A signal relating to wheel speed/tire profile frequency is supplied to the first input ES21. A signal relating to torque is supplied to the first output AS21.

The third amplifier G3 comprises an input EG3 and an output AG3.

The third sine wave generator S3 comprises a first input ES31, a second input ES32 and a first output AS31. A signal relating to further vehicle signals, for example oscillations and/or vibrations of the transmission and/or of the differential, is supplied to the first input ES31. A signal relating to torque is supplied to the first output AS31.

The signal filtering/signal modifying unit M1 comprises an input EM1 and an output AM1. A signal relating to IMU (for example Z direction)/steering gear signals is supplied to the first input EM1.

The fourth amplifier G4 has an input EG4 and an output AG4.

The first summing unit SUM1 has a first input ESUM11, a second input ESUM12, a third input ESUM13 and a fourth input ESUM14.

The first summing unit SUM1 further has an output ASUM11.

The second summing unit SUM2 has a first input ESUM21 and a second input ESUM22.

The second summing unit SUM2 further has an output ASUM21.

The output AG1 of the first amplifier G1 is connected to the second input ES12 of the first sine wave generator S1. An amplitude signal is transmitted.

The output AG2 of the second amplifier G2 is connected to the second input ES22 of the second sine wave generator S2. An amplitude signal is transmitted.

The output AG3 of the third amplifier G3 is connected to the second input ES32 of the third sine wave generator S3. An amplitude signal is transmitted.

The output AS11 of the first sine wave generator S1 is connected to the first input ESUM11 of the first summing unit SUM1. A signal relating to torque is transmitted.

The output AS21 of the second sine wave generator S2 is connected to the second input ESUM12 of the first summing unit SUM1. A signal relating to torque is transmitted.

The output AS31 of the third sine wave generator S3 is connected to the third input ESUM13 of the first summing unit SUM1. A signal relating to torque is transmitted.

The output AM1 of the signal filtering/signal modifying unit M1 is connected to the input EG4 of the fourth amplifier G4.

The output AG4 of the fourth amplifier G4 is connected to the fourth input ESUM14 of the first summing unit SUM1. A signal relating to torque is transmitted.

A signal relating to basic steering feel torque request is supplied to the first input ESUM21 of the second summing unit SUM2.

The output ASUM11 of the first summing unit SUM1 is connected to the second input ESUM22 of the second summing unit SUM2. A signal relating to natural oscillation torque request is transmitted.

A signal relating to feedback actuator (FBA) torque demand is supplied to the output ASUM21 of the second summing unit SUM2.

Further details of the present invention will become apparent in particular from basic functions of the steering device according to the invention.

Natural oscillations are measured in particular with the frequency of, for example, the engine speed or the wheel speed.

These signals are measured, for example, by acceleration sensors, speed sensors, etc. (not shown). The amplitudes of the signals that are fed back can be correspondingly adjusted.

The vehicle oscillations are recorded by means of sensors (not shown). For example, the speed of the wheel 8 is recorded by wheel speed sensors, the speed of the engine by engine speed sensors, and further oscillations by IMU (inertial measurement unit) sensors.

Signals that, for example, are already present in the form of a frequency, for example engine speed, wheel frequency, tire profile frequency, are in each case the frequency input signal for sine wave signal generators S1, S2 and S3. The respective amplitude is tuneable and additionally dependent on further signals, such as accelerator position, vehicle velocity, etc.

Further signals that, for example, are not present in the form of a frequency, such as IMU or steering signals (rack position), are filtered and converted by means of a amplifier G1, G2, G3 or G4 into a corresponding torque at the steering wheel 1, which ultimately reflects the effect of the oscillation at the steering wheel 1. The individual components are first added to give a natural oscillation torque request and then the basic steering feel torque request. The driver thus receives feedback about the naturally occurring oscillations in the vehicle.

The steering device can be used for any vehicles, preferably motor vehicles, commercial vehicles, etc. Any types of drive, for example electric engines and/or combustion engines, are also conceivable.

What is claimed is:

1. A steering device for a vehicle, comprising:
a steering wheel, which is able to act on a steering sensor for measuring a rotation angle position of the steering wheel;
a feedback actuator acting on the steering wheel;
an electromechanical actuator, which is able to act on a rack for steering wheels; and
an electronic controller, which is adapted to detect the rotation angle position of the steering wheel and to control the electromechanical actuator, wherein the electronic controller is adapted to measure natural oscillations of the vehicle and to apply them with a corresponding amplitude to the feedback actuator, wherein the electronic controller includes:
    a sine wave generator including a first input, a second input, and a first output, wherein a signal relating to oscillations and/or vibrations of a transmission and/or of a differential, can be supplied to the first input, wherein a signal relating to torque can be supplied to the first output;
    a signal filtering/signal modifying unit including an input and an output, wherein a signal relating to IMU, including a Z direction signal, and/or steering gear signals can be supplied to the first input;
    an amplifier including an input and an output;
    a first summing unit including a first input, a second input, a third input, a fourth input, and an output; and
    a second summing unit including a first input, a second input, and an output.

2. The steering device according to claim 1, wherein the sine wave generator is a first sine wave generator, the amplifier is a first amplifier, and the electronic controller further includes:
    a second amplifier for signals relating to vehicle velocity, accelerator position, and road deviation;
    a second sine wave generator;
    a third amplifier for signals relating to vehicle velocity and accelerator position;
    a third sine wave generator; and
    a fourth amplifier for signals relating to vehicle velocity, accelerator position, and road deviation.

3. The steering device according to claim 2, wherein:
the second amplifier comprises an input and an output,
the second sine wave generator comprises a first input, a second input and a first output, wherein a signal relating to engine speed can be supplied to the first input, wherein a signal relating to torque can be supplied to the first output, the third amplifier comprises an input and an output,
the third sine wave generator comprises a first input, a second input and a first output, wherein a signal relating to wheel speed/tire profile frequency can be supplied to the first input, wherein a signal relating to torque can be supplied to the first output, and
the fourth amplifier comprises an input and an output.

4. The steering device according to claim 3, wherein:
the output of the second amplifier is connected to the second input of the second sine wave generator, wherein the connection is adapted to transmit an amplitude signal;
the output of the third amplifier is connected to the second input of the third sine wave generator, wherein the connection is adapted to transmit an amplitude signal; and
the output of the fourth amplifier is connected to the second input of the first sine wave generator, wherein the connection is adapted to transmit an amplitude signal.

5. The steering device according to claim 4, wherein:
the output of the second sine wave generator is connected to the first input of the first summing unit, wherein the connection is adapted to transmit a signal relating to a torque;
the output of the third sine wave generator is connected to the second input of the first summing unit, wherein the connection is adapted to transmit a signal relating to a torque;
the output of the first sine wave generator is connected to the third input of the first summing unit, wherein the connection is adapted to transmit a signal relating to a torque.

6. The steering device according to claim 5, wherein:
the output of the signal filtering/signal modifying unit is connected to the input of the first amplifier;
the output of the first amplifier is connected to the fourth input of the first summing unit, wherein the connection is adapted to transmit a signal relating to a torque;
the first input of the second summing unit is adapted to be supplied with a signal relating to basic steering feel torque request;
the output of the first summing unit is connected to the second input of the second summing unit, wherein the connection is adapted to transmit a signal relating to natural oscillation torque request;
the output of the second summing unit is adapted to be supplied with a signal relating to feedback actuator torque demand.

7. The steering device according to claim 1, wherein the steering device is a steer-by-wire steering device for a motor vehicle.

* * * * *